US006737036B2

(12) United States Patent
Dettling et al.

(10) Patent No.: US 6,737,036 B2
(45) Date of Patent: May 18, 2004

(54) CATALYST COMPOSITIONS EMPLOYING SOL GEL PARTICLES AND METHODS OF USING THE SAME

(75) Inventors: Joseph C. Dettling, Howell, NJ (US); Joseph H-Z. Wu, Somerset, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/308,366

(22) Filed: Dec. 3, 2002

(65) Prior Publication Data

US 2003/0095903 A1 May 22, 2003

Related U.S. Application Data

(62) Division of application No. 09/417,436, filed on Oct. 13, 1999, now Pat. No. 6,528,029.

(51) Int. Cl.[7] .............................................. C01G 57/00
(52) U.S. Cl. ................................................... 423/593.1
(58) Field of Search ....................................... 423/593.1

(56) References Cited

U.S. PATENT DOCUMENTS

| 4,624,940 A | 11/1986 | Wan et al. |
| 4,727,052 A | 2/1988 | Wan et al. |
| 4,738,947 A | 4/1988 | Wan et al. |
| 5,057,483 A | 10/1991 | Wan et al. |
| 5,397,758 A | 3/1995 | Bouruetaubertot et al. |
| 5,417,956 A | 5/1995 | Moser |
| 5,460,701 A | 10/1995 | Parker et al. |
| 5,466,646 A | 11/1995 | Moser |
| 5,514,349 A | 5/1996 | Parker et al. |
| 5,597,771 A | 1/1997 | Hu et al. |
| 5,620,672 A | 4/1997 | Galligan et al. |
| 5,874,684 A | 2/1999 | Parker et al. |
| 5,898,014 A | 4/1999 | Wu et al. |
| 5,948,723 A | 9/1999 | Sung |
| 5,989,507 A | 11/1999 | Sung et al. |
| 6,133,194 A | 10/2000 | Cuif et al. |

FOREIGN PATENT DOCUMENTS

| EP | 0 123 293 | 4/1984 |
| EP | 0 385 958 | 2/1990 |
| WO | WO 95/33561 | 12/1995 |
| WO | WO 97/12672 | 4/1997 |
| WO | WO 98/09726 | 3/1998 |
| WO | WO 98/13139 | 4/1998 |
| WO | WO 98/14274 | 4/1998 |

OTHER PUBLICATIONS

Mat. Res. Bull., vol. 22, pp, 99–108, 1986, "Hydrothermal Preparation of Ba(Ti, Zr)O$_3$ Fine Powders", Vivekanandan, et al.

Mat. Res. Bull., vol. 22, pp, 641–650, 1987, "Ultrafine Powders of SrTiO3 from the Hydrothermal Preparation and Their Catalytic Activity in the Photolysis of Water", Avudaithai, et al.

Primary Examiner—Stanley S. Silverman
Assistant Examiner—Jonas N. Strickland
(74) Attorney, Agent, or Firm—Richard A. Negin

(57) ABSTRACT

Composite of at least two metal oxides in the form of Primary Particles and a support having a particle size greater than the Primary Particles used in the formation of a catalyst composition for the treatment of a pollutant containing gas.

13 Claims, No Drawings

CATALYST COMPOSITIONS EMPLOYING SOL GEL PARTICLES AND METHODS OF USING THE SAME This application is a divisional of U.S. application Ser. No. 09/417,436, now U.S. Pat. No. 6,528,029, filed on Oct. 13, 1999.

FIELD OF THE INVENTION

The present invention is generally directed to catalytic compositions in which one of the components thereof is a composite of at least two metal oxides in the form of a sol having a very small particle size. The metal oxides are secured to bulk particles made up of metal oxides to provide a component of a catalyst composition containing washcoat which exhibits high activity and/or selectivity for converting various compounds to harmless byproducts. The catalytic composition may also include an optionally catalytically active metal such as a precious metal. A hydrothermal process of preparing the composite for the catalyst composition is also disclosed.

BACKGROUND OF THE INVENTION

Catalyst compositions are generally applied to a substrate to form thereon a washcoat so that the active component of the washcoat (e.g. a precious metal and/or base metal) is available for contact with compounds capable of being converted (e.g. pollutants) to a harmless compound (e.g. carbon dioxide).

Catalytic converters typically employ a monolith structure as the substrate for applying the washcoat. The monolith structure is typically comprised of a plurality of polygonal channels. The channels provide significant surface area for placement of the washcoat and therefore provide a highly active surface for the catalytic reaction.

More recently, catalyst compositions forming washcoats have been placed on existing substrates of devices which come into contact with a gas stream such as a stream of air (see for example, U.S. Ser. No. 08/682,174 filed Jul. 16, 1996). As disclosed therein, washcoats have been placed on the fins of a radiator, various components of air conditioning systems and have been proposed for other non-monolithic structures.

Catalyst compositions for forming washcoats include a catalytically reactive metal such as precious metal, base metals or combination thereof and a support for the active metal such as alumina, titania and the like. For some applications, the washcoat may also contain an oxygen storage component (OSC) such as ceria.

Current methods for forming a washcoat on a monolithic structure involve either applying a composite to the monolith before the precious metal is applied, or the precious metal may first be applied to the support material and then the composite applied thereafter. The components of the composition can be calcined before being applied to the monolithic structure and typically have a particle size in the micron range. Once the catalyst composition is applied to the monolith calcination is performed to fix the catalyst composition to the substrate.

The support material such as alumina, titania and the like is typically in the form of particles having a particle size of approximately one micron or larger. The catalytically active metal such as precious metal is deposited into the pores of the particles. However, when the catalytically active metal penetrates the micron sized particles by becoming lodged in the pores it is not readily accessible to the reactants present in the gas stream. In addition, when oxygen storage components (e.g. ceria) are used to form the washcoat, the oxygen storage component is not totally functional because of the lack of access of the gas to be treated to the active sites in the middle of the particle. Typical washcoat forming catalyst compositions are produced with micron scale particles for the support material and the OSC component which arise in part from the calcination of the particles at elevated temperatures which typically cause agglomeration.

Submicron (i.e. nanometer) sized particles are known in the art. Such particles have been produced in a particle size range of from about 1 to 30 nanometers for use in the making of catalysts, superconductors, and oxides for recording media as disclosed in Moser, U.S. Pat. Nos. 5,417,956 and 5,466,646, each of which is incorporated herein by reference.

Materials known as sols are also known in the art. According to C. Jeffrey Brinker et al. *Sol-Gel Science*, pp. 1–11 Academic Press (1999), a sol is defined as a colloidal suspension of solid particles in a liquid. The colloidal nature of the suspension arises when the dispersed phase is so small that gravitational forces are negligible and interactions are dominated by short-range forces, such as van der Waals attraction and surface charges. Sols are differentiated from gels which are generally characterized by molecules which reach macroscopic dimensions extending throughout the solution. Thus, a gel contains a continuous solid skeleton enclosing a continuous liquid phase.

Sols include nanometer sized particles which have been used to coat bulk particle sized oxides. Typically, the sol material (e.g. nanometer sized metal oxides) have been coated on micron sized bulk oxides and thereafter a precious metal has been applied to form a catalytic composition. The preparation of sol particles may be accomplished by hydrothermal process technology as disclosed in R. Vivekanandan et al. "Hydrothermal Preparation of Ba (Ti, Zr) $O_3$ Fine Powders", *Mat. Res. Bull*, Vol. 22, pp. 99–108 (1986) and M. Avudaithai "Ultrafine Powders of $SrTiO_3$ From the Hydrothermal Preparation And Their Catalytic Activity In The Photolysis Of Water" *Mat. Res. Bull*, Vol. 22, pp. 641–650 (1987), each of which is incorporated herein by reference.

The prior art use of single component or physically mixed sol particles, however, has generated impervious coatings that tend to crack and are easily poisoned due to the lack of pore structure generated. While the employment of smaller particles for a catalyst composition is desirable, the use of such particles has not gained commercial acceptance because washcoats formed thereby have not provided sufficient catalytic performance because of cracking and/or poisoning as mentioned above.

It would therefore be a significant advance in the art of preparing catalyst compositions to provide a stable catalyst composition which include components having very small particle sizes wherein such components are uniformly dispersed on bulk particle supports. Such compositions provide ready access of the catalytically active metal to the gas stream being treated. It would be a further advance in the art to provide a stable catalyst composition which employs catalytically active metals more effectively and evidences higher activity and/or selectivity for said gas stream.

SUMMARY OF THE INVENTION

The present invention is generally directed to a catalyst composition including a component produced as a sol containing fine particle metal oxides secured to support particles having a larger particle size. A catalytically active metal is deposited on the fine particles or on the support or both. The catalyst composition of the present invention provides ready access of the catalytically active metal to the gas stream to be treated in the substantial absence of cracking and poisoning.

More specifically, the present invention is directed to a catalyst composition comprised of a composite of two or more small particle metal oxides which have been secured to a larger particle support. The composite has a catalytically active metal secured to the small particles and/or the larger particle support. The resulting catalyst composition is useful for the catalytic conversion of compounds such as hydrocarbons, nitrogen oxides and the like. The present invention also encompasses methods of forming the composite to produce the fine particle structure and to methods of employing the composite to produce a catalyst composition for the catalytic conversion of a wide variety of chemical compounds to harmless by-products.

In one aspect of the present invention, there is provided a catalyst composition including a composite formed of at least two metal oxides comprised of "Primary Particles" as defined herein which has been secured to a support having a larger particle size than the Primary Particles.

In particular, there is provided a composite for use in the formation of a catalyst composition comprising:

(a) at least two metal oxides in the form of Primary Particles; and
(b) a support for the Primary Particles having a particle size larger than the Primary Particles.

In a further aspect of the invention, there is provided a catalyst composition comprising a composite as defined above and a catalytically active metal associated therewith.

In a further aspect of the present invention, there is provided a hydrothermal method of preparing the composite in which at least two metal oxides are treated in an aqueous system at temperatures below calcination temperatures to form an oxide dispersion comprised of Primary Particles. The hydrothermal method substantially prevents undesirable aggregation and provides particles which are especially adapted to be secured to the support in a manner which ensures favorable access to the gas being treated.

In a still further aspect of the present invention, the catalyst composition containing the metal oxide composite is deposited as a washcoat on a suitable substrate, and fixed thereto by conventional calcination, for the treatment of gas streams to convert a wide variety of compounds to harmless byproducts. In one such application, the catalyst composition is used to form a washcoat on a substrate such as a radiator and the catalytically active material is readily accessible to treat air to convert gases contained therein such as hydrocarbons, ozone and the like to harmless by products. In another, although not mutually exclusive application, the catalyst composition traps $NO_x$ gases which are converted to $NO_2$ and absorbed within the pores of the catalyst composition. Upon contact with the catalytically active material, $NO_2$ is converted to harmless compounds including nitrogen gas.

DETAILED DESCRIPTION OF THE INVENTION

The metal oxide composite of the present invention is made of particles of at least two metal oxides in the form of Primary Particles as hereinafter defined. The Primary Particles are secured to a support having a larger particle size than the Primary Particles. The metal oxide composite may include at least one catalytically active metal deposited on the Primary Particles and/or the support.

The metal oxides may be any metal oxide which can be used as a site for deposition of the catalytically active metal. Preferred metal oxides include rare earth oxides, alkaline earth oxides, transitional metal oxides, zirconia, silica, alumina and titania.

The catalytically active metals which may be employed in the catalyst composition include precious metals such as platinum, palladium, rhodium and combinations thereof as well as oxides of base metals including nickel, cobalt, iron and copper oxides.

The catalytically active metals such as base metals and precious metals may be combined with other components which provide an oxygen storage capacity to the catalyst composition of the present invention. Such components, which include ceria and other rare earth oxides of praseodymium and neodymium as well as zirconia, facilitate contact of oxygen with compounds to be converted by the catalyst composition. Details of oxygen storage compounds and their method of manufacture are disclosed in Z. Haetal, U.S. Pat. No. 5,597,771 and J. H. Z. Wu et al., U.S. Pat. No. 5,898,014, each of which is incorporated herein by reference.

In accordance with the present invention, the metal oxides are secured to the support and which may provide a site for attachment of the catalytically active metal such as precious metals are present in a particle size distribution referred to herein as "Primary Particles". "Primary Particles" include individual solid particles which are suspended in a sol or which appear as one of a plurality of particles loosely bound together constituting a secondary particle.

It is a feature of the present invention to provide a composite and a catalyst composition containing the same in which the metal oxides comprise Primary Particles (i.e. individual particles plus secondary particles). At least 30%, preferably at least 50% of the Primary Particles are individual particles having a particle size in the range of from about 2 to 10 nm, preferably from about 3 to 8 nm, most preferably from about 3 to 4 nm. The remaining particles constituting Primary Particles are secondary particles (individual particles loosely bound together) having a particle size of no more than about 300 nm.

The composite and catalyst composition employing the same of the present invention therefore employs extremely small particles (i.e. Primary Particles) which may serve as potential reception sites for the catalytically active metal.

The production of Primary Particles as defined herein can not be effectively produced by conventional calcining processes which operate at calcining temperatures of at least 450° C. The particles produced by calcining grow to sizes larger than desirable herein and often to particle sizes up to and exceeding one micron. In addition, the high temperatures cause a very strong bond between individual particles resulting in tightly bound agglomerates which tend to grow to particle sizes of one micron or more. The binding forces operating on such agglomerates are so strong, once the aggregates are formed, they are very difficult to break apart by conventional techniques.

The composite may be formed by chemical vapor deposition in which molecules of the precursors of the composite are deposited on a cool substrate. In another process, the precursors are formed into an aqueous solution and treated under high pressure, low temperature conditions. Sudden pressure release generates high shear stress which converts the precursors to composite oxides with the desirable particle size distribution. In a preferred aspect of the present invention, the composite is formed by a hydrothermal process in which process temperatures are maintained well below calcining temperatures.

The initial step of the hydrothermal synthesis which may be employed in the present invention is to use a precursor of the desired metal oxide(s) to form an aqueous slurry and/or solution. Then the aqueous slurry and/or solution are placed in an autoclave and heated up to a reaction temperature. The temperature employed in the hydrothermal synthesis is between the boiling point of the solution and the critical point of water, typically from about 100° C. to 350° C. Since it is a closed system in an autoclave, the pressure increases as the temperature increases. An inert gas such as nitrogen gas or an oxidizing gas may be used in the synthesis atmosphere. Under appropriate hydrothermal conditions sol materials, having well dispersed small nanometer-sized metal oxide particles, can be produced. The metal oxide Primary Particles can be readily secured to the larger support particles as described hereinafter.

When the hydrothermal process is performed in a conventional autoclave, the build-up of pressure increases as temperature increases. Therefore in a conventional autoclave, pressure is not an independent parameter. However, since pressure has an independent effect on the final product, it is often desirable to control the pressure in the autoclave by using pumps and valves.

The metal oxides in the form of Primary Particles are formed at relatively low temperatures (e.g. from about 100° C. to 350° C.) and at relatively low pressures (e.g. less than 2,900 psi) in an oxidizing or inert atmosphere. The feed materials for the hydrothermal synthesis process are typically purified metal oxides that can include liquid or solids generated from hydrometallurgical or other chemical processes. The basic hydrothermal process in accordance with the present invention is to combine a feed slurry or solution of the metal oxides, hydroxides and salts of the corresponding metal oxides product into a batch reactor or a continuous flow reactor which heats the slurry to a temperature in the range of from about 100° C. to 350° C. At this temperature the feed materials react and/or transform, primarily through dissolution and precipitation to the stable oxide form. Reaction times can be as short as ten minutes in a continuous flow reactor. In a typical batch cycle, the slurry is heated to the reaction temperature and held for up to 24 hours.

After the reaction is complete, the materials are cooled, either by batch cooling or in other ways such as by pumping the product through a double-pipe heat exchanger. Once the temperature is reduced below approximately 100° C., the slurry can be released through a pressure let down system to ambient pressure. The product is then recovered by filtration. A series of wash steps may be required to remove any salts that are formed as by-products. The clean filter cake is then dried in a tray or tunnel dryer or reslurried with water to make a dispersion or reslurried with water and spray dried.

Since the metal oxide formation takes place in a aqueous system at relatively low temperatures (i.e. from about 100° C. to 350° C.), high temperature calcination (450° C. or higher) is avoided. The metal oxide particles formed in the hydrothermal process are Primary Particles as defined herein and are therefore finer and "looser" than particles formed by conventional precipitation and calcining. It has been observed that Primary Particles formed by hydrothermal synthesis have a higher surface area and can more effectively retain the catalytically active metal so that there is greater and more efficient contact of the incoming gas stream with the catalytically active metal.

Thus, metal oxides in the form of Primary Particles are employed to enhance the activity rate of the catalyst compositions containing the same because of the greater availability of the catalytically active material to the incoming gas stream. The fine particle materials are synthesized, preferably through a hydrothermal process which produces Primary Particles of a metal oxide which may have precious metal or other metal oxide incorporated therein. Since the metal oxide formation is in an aqueous system at lower temperatures, high temperature calcination is avoided which tends to cause particles to strongly adhere to each other as agglomerates.

The Primary Particles formed as described above are then secured to a support having a particle size exceeding the Primary Particles, typically having a particle size of at least 0.5 um, preferably up to about 50 um.

An important step in securing the Primary Particles to the support particles is to combine both the Primary Particles and the support particles well dispersed in a liquid media, preferably water. The intimate mixing of the Primary Particles and the support particles enables uniform placement of the Primary Particles on the support.

The support materials which may be employed in the present invention generally have high surface areas and are compatible with the Primary Particles. Useful high surface area supports include one or more refractory oxides. These refractory oxides include, for example, silica and alumina; mixed oxide forms such as silica-alumina; aluminosilicates which may be amorphous or crystalline; alumina-zirconia; alumina-chromia; alumina-ceria; and the like. The support is substantially comprised of alumina which preferably includes the members of the gamma or transitional alumina, such as gamma and eta aluminas, and, if present, a minor amount of other refractory oxide, e.g., about up to 20 weight percent. Other support materials include quartz, corderite and the like. Desirably, the support has a specific surface area of from 60 to 350 m$^2$/g. A preferred support material is gamma alumina having a surface area of about 150 m$^2$/g.

The slurry for forming the catalyst composition may include conventional additives such as binders, surfactants, thickeners, biocides, antioxidants and the like. Binders such as alumina and zirconia aid the catalyst composition in adhering to a desired substrate such as a monolith, a radiator and the like. Dispersants are used to enhance stability of the Primary Particles by preventing adherence to each other (i.e. anti-agglomeration agent). Preferred dispersants comprise polymers containing carboxylic acid groups or derivative thereof such as esters and salts. Such preferred dispersants include Accusol 445 (from Rohm & Haas) and Colloid 226/35 (from Rhone-Poulenc). Useful dispersants and a review of dispersion technology are presented in, *Additives for Dispersion* Technology, published by Rhone-Poulenc, Surfactants & Specialties, incorporated herein by reference. Useful polymeric dispersants include but are not limited to polyacrylic acid partial sodium salts and anionic copolymer sodium salts sold by Rhone-Poulenc as Colloid™ polymeric dispersants.

EXAMPLE 1

A cerium hydroxide precipitate was made by adding ammonium hydroxide into a cerium nitrate solution. The precipitate was then washed with deionized water and redispersed. Fine zirconium oxide powder was added and mixed well with the cerium hydroxide dispersion. Praseodymium nitrate and neodymium nitrate were added into the slurry. The appropriate amount of the ingredients were added to produce a metal oxide composite of the present invention having oxygen storage capability with the nominal composite formula of $28CeO_2\text{-}7Nd_2O_3\text{-}7Pr_6O_{11}\text{-}58ZrO_2$.

The pH of the slurry was adjusted by ammonium hydroxide so the pH was at least 7. The mixed slurry was transferred to an autoclave and under constant stirring. The autoclave was heated to about 200 C. for about 2 to 4 hours. The autoclave was cooled and the oxide was separated form the mother liquor and washed with deionized water. The pH of the dispersion was adjusted to stabilize the Primary Particles of the composite composition.

EXAMPLE 2

The metal oxide composite produced in accordance with Example 1 was examined to determine the size of the Primary Particles. TEM (transmission electronic microscopy) showed that the size of the Primary Particles was about 3–5 nm. The Primary Particle size of a conventional metal oxide of the same composition produced by the steps of precipitation, drying and calcination was approximately two and a half to four times larger or about 12 nm.

Morphology testing showed that the composite metal oxide produced in accordance with the present invention had individual particles and some particles formed into loose (weak) aggregates as compared to powders which were calcined.

The surface area of the material produced in accordance with the present invention was 188 $m^2/g$ which is a very high surface area product.

The metal oxide composite produced in accordance with Example 1 was analyzed and compared to an oxide made by a conventional calcination process. The infrared spectra showed a different framework between the two metal oxide composites which reflects a difference in atomic structure. It was also observed that the present metal oxide composite had more Lewis acid sites than conventional powders. In addition, there were more-OH groups than conventional powders. Both observations indicate more reactive surfaces are available for catalysis to occur.

EXAMPLE 3

Two metal oxide composites were prepared having the formula shown in Example 1 ($28CeO_2\text{-}7Nd_2O_3\text{-}7Pr_6O_{11}\text{-}58ZrO_2$). One sample (comparative sample) was prepared using a conventional precipitation method with calcining in air. The second sample (sample 1) was prepared in a manner similar to Example 1. The BET surface area ($m^2/g$) for each of the two samples was measured before use (fresh catalyst). The results are shown in Table 1.

TABLE 1

| Sample | Fresh |
|---|---|
| Comparative Sample | 71 |
| Sample 1 | 223 |

The results show that the materials prepared by different processes resulted in different fresh BET surface area. The metal oxide composite of the present invention had a significantly higher surface area (223 $m^2/g$) than the conventionally prepared bulk sample (71 $m^2/g$). However, after thermal aging the BET surface area of the two samples tend to become equivalent. The results demonstrate that calcining (high temperature treatment) tends to bond particles into lower surface area agglomerates. Preparation of the metal oxide composite of the present invention eliminates high temperature calcining in the formation stage and provides exceptional surface area particles which are more efficient in treating pollutant containing gas streams at temperatures generally below about 1000° C.

EXAMPLE 4

The process of Example 1 was employed to produce a metal oxide composite having the general formula $2OBaO\text{-}22CeO_2\text{-}6Nd_2O_3\text{-}6Pr_6O_{11}\text{-}46ZrO_2$. The composite was particularly suited as a NOx trap material and had a BET surface area of 201 $m^2/g$. After the metal oxide composite was formed, the composite was dried and calcined at 450° C. in air for one hour. The sample was then subjected to a NOx adsorption test. 10 mg of the sample was loaded in a sample holder of a thermogravimetric analyzer (STA-1500H). The temperature was increased to 200° C. in nitrogen and maintained at that level. A gas containing 0.5% $NO_2$ in nitrogen was passed through the analyzer at the rate of 30 standard cubic centimeters per minute. The weight change of the sample was recorded and the amount of NOx adsorption was calculated. The NOx adsorption rate was 9 ppm (trapped material as 100% base) per second, and a capacity of $\geq 2.7$ wt % was observed (original material as 100% of base).

EXAMPLE 5

A platinum/rhodium catalyst comparative sample was made in the following manner.

0.45 g of a metal oxide composite having the formula shown in Example 1 but prepared under conventional calcining conditions was combined with 1.2905 g of rhodium nitrate solution (with 0.506 wt % rhodium) under constant stirring. 2.6752 g of platinum nitrate solution (with 1.555 wt % platinum) was then added dropwise under constant stirring. 2.5820 g of a support material, jet milled alumina, was mixed uniformly with the slurry. 0.1 g of alumina acetate binder material was then added. 3 drops of acetic acid with 2 drops of deionized water were then added and the mixture was stirred. The cake was then conventionally heated, dried and calcined at 450° C. for 1 hour to produce a catalyst composition. The calcined cake was crushed and sieved to make particles having a particle size of about 300 $\mu$m.

EXAMPLE 6

A platinum/rhodium catalyst produced in accordance with the present invention was made as follows.

2.9735 g of the metal oxide composite sol (14.73 wt % solids) produced in accordance with Example 1, and 1.113 g of rhodium nitrate solution (with 0.5282 wt % rhodium) was added under constant stirring. Then 1.875 g of platinum nitrate solution (with 2.000 wt % platinum) was then added dropwise under constant stirring. 2.4167 g of jet milled alumina, having a surface area of 150 $m^2/g$, was mixed uniformly with the slurry. 0.1 g of alumina acetate binder was added. 3 drops of acetic acid were then added and the mixture was stirred. The cake was then conventionally heated, dried and calcined at 450° C. for 1 hour to produce a catalyst composition. The calcined cake was crushed and sieved to make particles having an average size of 300 $\mu$m.

The samples produced in accordance with Examples 5 and 6 were tested in the following manner.

Twenty milligrams of each test sample was mixed with 80 milligrams of cordierite particles (average particle size 300

μm) and loaded into a laboratory Model Gas Reactor. The catalyst was aged at 1000° C. for 6 hours in a simulated exhaust gas mixture employing a perturbation of ±0.2 A/F@ 0.167 Hz@ stoichiometric set point and an exceptionally high 350,000 VHSV space velocity. The aged catalyst was then evaluated at 500° C. in the same reactor with similar exhaust gas mixture, employing a ±0.1 A/F perturbation. The average feed gas composition at the evaluation conditions contained 0.57% CO, 0.19% $H_2$, 0.19% NO, 0.285% $O_2$, 20 ppm $SO_2$ and balance $N_2$.

The results are shown in Table 2.

TABLE 2

| Sample | Conversion Rates | |
|---|---|---|
|  | NO (20 ppm S) | CO 20 ppm S |
| 5 | 67 | 60 |
| 6 | 70 | 66 |

The catalyst composition produced in accordance with the present invention (Sample 6) provided superior results to the comparative Example (Sample 5). Both the NO and CO conversion rate of the sample of the present invention was higher than the comparative sample. It should be noted that when high space velocities are employed as in this example, relatively small differences in conversion rates are significant because of the volume of gas being treated.

What is claimed:

1. A method of forming a composite for use in a catalyst composition, said composite comprising:
   a) Primary Particles of at least two metal oxides wherein 30% of the Primary Particles are individual particles having a particle size of from about 2 to 10 nm; and
   b) a support having a particle size greater than the Primary Particles, said metal oxides being secured to said support, said method comprising:
      1) forming an aqueous media containing at least one metal oxide or precursor thereof; and
      2) heating the aqueous media in a reaction vessel to a reaction temperature to form at least one stable metal oxide.

2. The method of claim 1 wherein the precursor of the metal oxides are selected from metal hydroxides and metal salts.

3. The method of claim 1 wherein the aqueous media is heated to a temperature of from about 100 to 350° C.

4. The method of claim 1 further comprising heating the aqueous media in the presence of an inert gas.

5. The method of claim 1 further comprising heating the aqueous media in an oxidizing atmosphere.

6. The method of claim 1 further comprising controlling the pressure of the heating step.

7. The method of claim 6 controlling the pressure to a level of less than about 2900 psi.

8. The method of claim 1 further comprising reducing the temperature below about 100° C. and filtering the aqueous media to recover the composite.

9. The method of claim 1 wherein the metal oxides are selected from the group consisting of rare earth oxides, alkaline earth oxides, transition metal oxides, zirconia, silica, alumina and titania.

10. The method of claim 1 further comprising adding an oxygen storage component to the aqueous media.

11. The method of claim 1 wherein the individual particles have a particle sizes of from about 3 to 8 nm.

12. The method of claim 1 wherein at least 50% of the Primary Particles are individual particles having a particle size of from about 2 to 10 nm.

13. The method of claim 1 wherein the Primary Particles further comprise secondary particles having a particle sizes of up to about 300 nm.

* * * * *